Patented June 5, 1951

2,555,917

UNITED STATES PATENT OFFICE 2,555,917

N-(TERTIARY - AMINOALKYLMERCAPTO-ALKYL) DIPHENYL-ACETAMIDES AND THEIR PREPARATION

Raymond O. Clinton, Albany County, N. Y., assignor to Sterling Drug Inc., Wilmington, Del., a corporation of Delaware No Drawing. Application July 3, 1948, Serial No. 37,069

8 Claims. (Cl. 260—501)

This invention relates to basic amides derived from diphenylacetic acid and sulfur-containing tertiary-aminoalkylamines, to addition salts thereof, and to methods of preparing said basic amides.

I have found that basic compounds having the following formula exhibit useful pharmacological properties:

$(C_6H_5)_2CHCONH-Y-S-Z-B$ where Y and Z are lower alkylene radicals; and B is a lower aliphatic-like tertiary-amino group.

In the above formula the groups designated as Y and Z, preferably have 2 to 4 carbon atoms, including such groups as $-CH_2CH_2-$,
$-CH_2CH_2CH_2-$
$-CH_2CH_2CH_2CH_2-$
and

The lower aliphatic-like tertiary-amino group, shown above as B, comprehends lower dialkylamino groups illustrated by examples such as dimethylamino, diethylamino, ethylmethylamino, di-n-butylamino, and the like; and lower saturated N-heterocyclic groups illustrated by examples such as 1-piperidyl, 2-methyl-1-piperidyl, 1-pyrrolidyl, 4-morpholinyl, and the like. In other words, BH designates a lower aliphatic-like secondary-amine as illustrated by diethylamine, di-n-butylamine, 2,6-dimethylpiperidine, and the like.

Specific illustrations of my invention follow:

(1) N - (3 - (2 - dimethylaminoethylmercapto)-2-propyl) diphenylacetamide,

(2) N - (3 - (3 - (1 - piperidyl) propylmercapto)-2-propyl) diphenylacetamide,

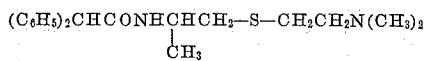

(3) N - (3 - (2 - (2 - methyl - 1 - piperidyl)-ethylmercapto)-2-propyl) diphenylacetamide,

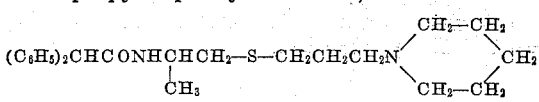

(4) N - (2 - (2 - diethylaminoethylmercapto)-ethyl) diphenylacetamide,

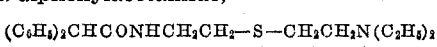

In practicing my invention I prepared my basic amides by one of two general methods: (a) reaction of a diphenylacetyl halide of the formula $(C_6H_5)_2CHCO$-halogen with the appropriate basic amine of the formula $B-Z-S-Y-NH_2$, where B, Z, and Y have the meanings specified hereinabove; or (b) reaction of a lower alkyl ester of diphenylacetic acid of the formula, $(C_6H_5)_2CHCOO-$(lower alkyl), with the basic amine of the formula, $B-Z-S-Y-NH_2$, where B, Z, and Y have the meanings specified hereinabove, preferably in the presence of a basic catalyst, such as sodium or a sodium alkoxide. While method (b) is preferably run in the presence of a basic catalyst, this method is also operable in the absence of such a catalyst.

In the preparation of the basic amides of my invention using procedure (a), little or no heat is needed to carry out the reaction. In fact, prolonged heating of the sulfur-containing-tertiary-aminoalkylamines with a diphenylacetyl halide may produce mixtures from which no crystalline substance can be obtained. The reaction between the acid halide and the diamine may result in the deposition of the hydrochloride in a form which resists crystallization, or which if crystallized is found to be hygroscopic. However the sometimes inconvenient physical properties of these hydrochlorides in the solid state do not preclude their effective preparation and use in solution, and in fact the high solubility of these hydrochlorides is often advantageous. Where solid crystalline salts of convenient physical properties are desired, I have found the citrates to be suitable. These are prepared by treating a solution of the free basic amide with an equivalent of citric acid monohydrate.

Preparation of the intermediate sulfur-containing tertiary-aminoalkylamines are described in the literature by Clinton et al., J. Am. Chem. Soc. 67, 594 (1945) and ibid. 69, 519 (1947).

I found it convenient to isolate and use the basic amides of my invention as the water-soluble citric acid salts or hydrochloric acid addition salts. It is, of course, understood that other water-soluble salts, such as those derived from other non-toxic organic acids, including tartaric acid, succinic acid, and the like, and other non-toxic inorganic acids, including hydrobromic acid, sulfuric acid, phosphoric acid, and the like, have equivalent therapeutic efficacy and are within the scope of my invention.

Also comprehended by my invention are the quaternary salts of our basic amides, said salts being derived from esters of strong inorganic acids and organic sulfonic acids, and such esters including methyl bromide, ethyl sulfate, n-propyl iodide, benzyl chloride, methyl para-toluenesulfonate, and the like.

The following examples illustrate specific embodiments of the invention:

N - (2 - (2 - diethylaminoethylmercapto)-ethyl)diphenylacetamide.—To a mixture of 17.6 g. (0.100 mole) of 2-(2-diethylaminoethylmercapto)-ethylamine, 12.6 g. (0.150 mole) of sodium bicarbonate, and 80 ml. of water is added, with vigorous stirring, a solution of 27.6 g. (0.12 mole) of diphenylacetyl chloride in 100 ml. of chloroform during a period of forty-five minutes. After the mixture has been stirred for one additional hour, the chloroform layer is separated, washed with dilute sodium hydroxide solution and with water, and dried over anhydrous potassium carbonate. Removal of the chloroform by distilling in vacuo yields a viscous colorless oil which readily crystallizes. Two recrystallizations from ethyl acetate-petroleum ether (n-pentane fraction) gives 24.5 g. (62.3%) of N-(2-(2-diethylaminoethylmercapto)ethyl)diphenylacetamide as white leaflets, M. P. 56-7° C. The citrate of this amide is formed by treating an acetone solution of the amide with an equivalent quantity of citric acid monohydrate dissolved in acetone. This salt, N - (2 - (2 - diethylaminoethylmercapto)ethyl)-diphenylacetamide citrate, M. P. 80° C., forms as white rosettes.

Other basic amides are prepared according to the above procedure when other sulfur-containing tertiary-aminoalkylamines are used. Thus, N - (3-(2-dimethylaminoethylmercapto)-2-propyl)diphenylacetamide is prepared when the diamine is 3-(2-dimethylaminoethylmercapto) - 2-propylamine; N-(3-(3 - diethylaminopropylmercapto)propyl)diphenylacetamide is formed when the diamine is 3 - (3 - diethylaminopropylmercapto)propylamine; and N-(3-(2-(1-piperidyl)-ethylmercapto)propyl)diphenylacetamide results when 3-(2-(1 - piperidyl)ethylmercapto)propylamine is used.

In addition, the basic amides of my invention are formed when the appropriate sulfur-containing tertiary-aminoalkylamine is reacted with a lower alkyl ester of diphenylacetic acid. This reaction is carried out by refluxing a petroleum ether (fraction of mixed octanes) solution of equimolar quantities of the diamine and ester for several hours preferably in the presence of a small amount of sodium, adding an equivalent amount of benzene, washing the resulting mixture with water, drying the same over anhydrous sodium sulfate, removing the solvents by distilling in vacuo, and treating the residual oil as in the above example. In such a manner is obtained N - (2 - (2 - diethylaminoethylmercapto)-ethyl)diphenylacetamide citrate from methyl diphenylacetate and 2-(2-diethylaminoethylmercapto)ethylamine. This preparation can also be carried out using sodium ethoxide as the basic catalyst in place of sodium or in the absence of any basic catalyst.

I claim:

1. A member of the group consisting of a basic amide having the formula (C6H5)2CHCONH—Y—S—Z—B where Y and Z are lower alkylene radicals each having 2 to 4 carbon atoms; and B is a member of the group consisting of lower dialkylamino and 1-piperidyl groups; and non-toxic acid addition and quaternary ammonium salts thereof.

2. N-(2-(2-diethylaminoethylmercapto)ethyl)-diphenylacetamide citrate.

3. The process of preparing a basic amide having the formula (C6H5)2CHCONH—Y—S—Z—B where Y and Z are lower alkylene radicals each having 2 to 4 carbon atoms; and B is a member of the group consisting of lower dialkylamino and 1-piperidyl groups which comprises reacting a diamine of the formula H2N—Y—S—Z—B with an acylating agent selected from the group consisting of the lower alkyl esters and the acid halides of diphenylacetic acid.

4. The process of preparing N-(2-(2-diethylaminoethylmercapto)ethyl) diphenylacetamide which comprises reacting diphenylacetyl chloride with 2 - (2 - diethylaminoethylmercapto)ethylamine.

5. A basic amide having the formula (C6H5)2CHCONH—Y—S—Z—N—(lower alkyl)2 where Y and Z are lower alkylene radicals each having 2 to 4 carbon atoms.

6. Addition salts with non-toxic acids of the basic amide of claim 5.

7. N - (2 - (2 - diethylaminoethylmercapto)-ethyl)diphenylacetamide.

8. Addition salts with non-toxic acids of the basic amide of claim 7.

RAYMOND O. CLINTON.

REFERENCES CITED

The following references are of record in the file of this patent:

UNITED STATES PATENTS

| Number | Name | Date |
|---|---|---|
| 2,009,144 | Miescher et al. | July 23, 1935 |

OTHER REFERENCES

Clinton et al.: J. Am. Chem. Soc.; vol. 67 (April, 1945), pp. 594–597.

Huber et al.: J. Am. Chem. Soc.; vol. 68 (Feb., 1946), pp. 322–323.

Laskowski et al.: J. Am. Chem. Soc.; vol. 69 (Mar., 1947), pp. 519–521.